(12) United States Patent
Dhamrat et al.

(10) Patent No.: US 11,377,053 B2
(45) Date of Patent: Jul. 5, 2022

(54) EXTENDED SLIDE VEHICLE SEAT WITH LOW PROFILE ADJUSTMENT CONTROL

(71) Applicant: Toyota Motor Engineering & Manufacturing North America, Inc., Plano, TX (US)

(72) Inventors: Hamshivraj Singh Dhamrat, Saline, MI (US); Lindsay A. Babian, Canton, MI (US); Shelby Sutton-Brown, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/037,067

(22) Filed: Sep. 29, 2020

(65) Prior Publication Data

US 2022/0097631 A1 Mar. 31, 2022

(51) Int. Cl.
| | |
|---|---|
| *B60R 16/03* | (2006.01) |
| *B60N 2/22* | (2006.01) |
| *B60R 16/02* | (2006.01) |
| *B60R 16/027* | (2006.01) |
| *B60N 2/08* | (2006.01) |
| *G05G 1/04* | (2006.01) |
| *B60N 2/56* | (2006.01) |
| *B60N 2/02* | (2006.01) |
| *B60N 2/00* | (2006.01) |

(Continued)

(52) U.S. Cl.
CPC .............. *B60R 16/03* (2013.01); *B60N 2/002* (2013.01); *B60N 2/0232* (2013.01); *B60N 2/08* (2013.01); *B60N 2/22* (2013.01); *B60N 2/5685* (2013.01); *B60N 2/5692* (2013.01); *B60R 16/027* (2013.01); *B60R 16/0207* (2013.01); *B60R 22/48* (2013.01); *G05G 1/04* (2013.01); *B60N 2/3097* (2013.01); *B60R 2022/4816* (2013.01)

(58) Field of Classification Search
CPC ... B60R 16/03; B60R 16/0207; B60R 16/027; B60R 22/48; B60R 2022/4816; B60N 2/002; B60N 2/0232; B60N 2/08; B60N 2/22; B60N 2/5685; B60N 2/5692; B60N 2/3097
USPC ................................................... 297/180.12
See application file for complete search history.

(56) References Cited

U.S. PATENT DOCUMENTS

| | | |
|---|---|---|
| 7,331,558 B2 | 2/2008 | Ho |
| 8,585,145 B2 | 11/2013 | Nock et al. |
| 8,596,720 B2 | 12/2013 | Ootsuka et al. |

(Continued)

FOREIGN PATENT DOCUMENTS

| | | |
|---|---|---|
| CN | 201296187 Y | 8/2009 |
| CN | 201313520 Y | 9/2009 |

(Continued)

*Primary Examiner* — Mark R Wendell
(74) *Attorney, Agent, or Firm* — Haynes and Boone, LLP (57) ABSTRACT

Disclosed is a vehicle that includes a vehicle seat with a backrest, a cushion, a sliding rail, and a seat mount coupled to the sliding rail. A recline control handle positioned on the side of the seat includes a rotation axis parallel to a lateral axis of the vehicle. A slide control handle positioned on the side of the seat includes a rotation axis parallel to a longitudinal axis of the vehicle, and a recess configured to receive at least a portion of the slide control handle in both a first orientation and a second orientation.

20 Claims, 8 Drawing Sheets

(51) Int. Cl.
*B60R 22/48* (2006.01)
*B60N 2/30* (2006.01)

(56) References Cited

U.S. PATENT DOCUMENTS

| | | | |
|---|---|---|---|
| 8,960,757 B2 | 2/2015 | Otake et al. | |
| 10,336,222 B2 | 7/2019 | Jensen et al. | |
| 2014/0110986 A1* | 4/2014 | Yamaguchi | B60N 2/68 |
| | | | 297/378.1 |
| 2018/0345824 A1* | 12/2018 | Akimoto | B60N 2/22 |

FOREIGN PATENT DOCUMENTS

| | | | |
|---|---|---|---|
| CN | 112017141 A | | 9/2019 |
| CN | 209776241 U | | 12/2019 |
| JP | 2014083912 | * | 5/2014 |
| JP | 2015221640 | | 12/2015 |

\* cited by examiner

EXTENDED SLIDE VEHICLE SEAT WITH LOW PROFILE ADJUSTMENT CONTROL

TECHNICAL FIELD

The subject matter described herein relates to a vehicle seat with ergonomic adjustment controls that are operable over an extended range of forward-backward motion. This extended-slide vehicle seat has particular but not exclusive utility for cars, trucks, and vans.

BACKGROUND

Vehicle seats in a vehicle (e.g., a van) often sit on sliding rails. However, the sliding rails do not have a long range of motion, and provide the ability to move the seat forward or backward through only a fairly limited range. In addition, seat adjusting handles (e.g., a forward-backward positional adjustment handle or slide control handle) may be located on the front side of the vehicle seat. This is not ergonomically ideal, as it requires the user to bend forward and reach down in order to operate the handle. However, seat adjusting handles located on the side of the seat may encounter clearance issues as the seat slides past interior features of the vehicle. Accordingly, a need exists for vehicle seats with greater range of motion and more ergonomic controls.

The information included in this Background section of the specification, including any references cited herein and any description or discussion thereof, is included for technical reference purposes only and is not to be regarded as subject matter by which the scope of the disclosure is to be bound.

SUMMARY

Disclosed is a vehicle seat with extended sliding rails that permit a greater range of forward-backward travel for the seat. Seat adjustment handles are located on an outboard side of the seat, where they are easily accessed by the user's hand, without the user having to lean forward or extend arm reach. However, the extended travel range brings the seat into proximity with the vehicle's rear wheel well, leaving a space of only a few centimeters for the user's hand to operate the control handles. The control handles therefore include ergonomic features that allow the user's hand to operate them in this restricted space.

The extended-slide vehicle seat disclosed herein has particular, but not exclusive, utility for cars, trucks, and vans. The extended-slide vehicle seat includes a vehicle seat including: a backrest; a cushion; a wiring harness capable of providing electrical power to one or more vehicle seat accessories; at least one sliding rail including at least one electrical contact; at least one seat mount coupled to the at least one sliding rail, where when a rail lock of the at least one seat mount is released, the vehicle seat including the at least one seat mount is configured to slide forward or backward along the at least one sliding rail, where the seat mount is configured to provide electrical power to the wiring harness when the seat mount is positioned in contact with the at least one electrical contact. The vehicle also includes a recline control positioned on a lateral side of the vehicle seat and configured to control an orientation of the backrest relative to the cushion, the recline control including: a pivot pin including a rotation axis parallel to a longitudinal axis of the vehicle; a recline control handle coupled to the pivot pin, where the recline control handle is configured to rotate around the pivot pin from a first orientation to a second orientation. The vehicle also includes a recess disposed within the lateral side of the cushion and configured to receive at least a portion of the recline control handle in both the first orientation and the second orientation.

Implementations may include one or more of the following features. The vehicle where the recess includes a first portion for receiving the recline control handle in the first orientation and a second portion for receiving the recline control handle in the second orientation. In both the first orientation and the second orientation, a grip portion of the recline control handle is disposed on a lateral side of the recline control handle and proximate to a lateral side of the recess. The pivot pin is disposed proximate to a medial side of the recline control handle and a medial side of the recess, such that in both the first orientation and the second orientation, no portion of the recline control handle protrudes more than about 10 millimeters lateral of the lateral side of the vehicle seat. The at least one sliding rail includes two sliding rails, and the at least one seat mount includes two seat mounts. The at least one sliding rail is coupled to an underbody of the vehicle. The at least one sliding rail is configured to permit the vehicle seat to slide backward such that the recline control handle is proximate to a rear wheel well of the vehicle. The recline control handle is configured to be operable by a user's hand when the recline control handle is proximate to a rear wheel well of the vehicle. The at least one electrical contact includes a plurality of electrical contacts. The at least one electrical contact includes an electrical contact that is continuous along least a portion of the at least one sliding rail. The one or more vehicle seat accessories include at least one of a seat belt buckle sensor, a seat heater, a seat cooler, a seat motor, a seat actuator, or a weight sensor.

One general aspect includes a vehicle having a vehicle seat that includes a backrest, a cushion, at least one sliding rail, at least one seat mount coupled to the at least one sliding rail, where when a rail lock of the at least one seat mount is released, the vehicle seat including the rail lock is configured to slide forward or backward along the at least one sliding rail. The vehicle also includes a recline control positioned on a lateral side of the vehicle seat and configured to control an orientation of the backrest relative to the cushion, the recline control including: a first pivot pin including a rotation axis parallel to a lateral axis of the vehicle; a recline control handle coupled to the first pivot pin, where the recline control handle is configured to rotate around the first pivot pin from a first recline control orientation to a second recline control orientation. The vehicle also includes a slide control positioned on the lateral side of the cushion below the recline control, the slide control including: a second pivot pin including a rotation axis parallel to a longitudinal axis of the vehicle; a slide control handle coupled to the second pivot pin, where the slide control handle is configured to rotate around the second pivot pin from a first slide control orientation to a second slide control orientation. The vehicle also includes a recess disposed within the lateral side of the cushion and configured to receive at least a portion of the slide control handle in both the first slide control orientation and the second slide control orientation, where the slide control handle is configured to engage the rail lock in the first slide control orientation and release the rail lock in the second slide control orientation.

Implementations may include one or more of the following features. The vehicle where the recline control handle and slide control handle are configured such that when fingers of a user's hand are operating the slide control handle, at least a portion of a palm of the user's hand can rest on the recline control handle. The recess includes a first portion for receiving the slide control handle in the first slide control orientation and a second portion for receiving the slide control handle in the second slide control orientation. In both the first slide control orientation and the second slide control orientation, a grip portion of the slide control handle is disposed on a lateral side of the slide control handle and proximate to a lateral side of the recess. The second pivot pin is disposed proximate to a medial side of the recline control handle and a medial side of the recess, such that in both the first slide control orientation and the second slide control orientation, no portion of the recline control handle protrudes more than about 10 millimeters lateral of the lateral side of the cushion. The at least one sliding rail includes two sliding rails, and the at least one seat mount includes two seat mounts. The at least one sliding rail is configured to permit the vehicle seat to slide backward such that the recline control handle is proximate to a rear wheel well of the vehicle. The recline control handle is configured to be operable by a user's hand when the recline control handle is proximate to a rear wheel well of the vehicle.

One general aspect includes a vehicle; a vehicle seat positioned within the vehicle, the vehicle seat including; a backrest; a cushion; at least one sliding rail; at least one seat mount coupled to the at least one sliding rail, where when a rail lock of the at least one seat mount is released, the vehicle seat including the at least one seat mount is configured to slide forward or backward along the at least one sliding rail. The system also includes a recline control positioned on a lateral side of the vehicle seat and configured to control an orientation of the backrest relative to the cushion, the recline control including: a first pivot pin including a rotation axis parallel to a longitudinal axis of the vehicle; a recline control handle coupled to the first pivot pin, where the recline control handle is configured to rotate around the first pivot pin from a first recline control orientation to a second recline control orientation. The system also includes a first recess disposed within the lateral side of the cushion and configured to receive at least a portion of the recline control handle in both the first recline control orientation and the second recline control orientation. The system also includes a slide control positioned on the lateral side of the vehicle seat below the recline control, the slide control including: a second pivot pin including a rotation axis parallel to a longitudinal axis of the vehicle; a slide control handle coupled to the second pivot pin, where the slide control handle is configured to rotate around the second pivot pin from a first slide control orientation to a second slide control orientation. The system also includes a second recess disposed within the lateral side of the vehicle seat and configured to receive at least a portion of the slide control handle in both the first slide control orientation and the second slide control orientation, where the slide control handle is configured to engage the rail lock in the first slide control orientation and release the rail lock in the second slide control orientation.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the extended-slide vehicle seat, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Vehicle seats (e.g., front seats in the first seating row of a vehicle or rear seats in a second seating rows of the vehicle) typically sit on sliding rails, and may in some cases be user-removable without tools. However, the sliding rails typically do not have a long range of motion, and thus do not provide an ability for the seat to move significantly far forward or backwards.

In accordance with at least one embodiment of the present disclosure, an extended-slide vehicle seat (e.g., a passenger seat) is provided which includes extended sliding rails that permit a greater range of forward-backward travel for the seat. The sliding rail extends far enough to provide a wider range of motion than conventional sliding rails. In addition, the sliding rail can provide the vehicle set with power. In some embodiments, power is provided when the vehicle seat is slid into a particular position. In other embodiments, power is provided at multiple positions, or at all points along the sliding rail.

Seat adjustment control handles (e.g., recline control handle, slide control handle, etc.) are located on a side of the seat, where they are easily accessed by the user's hand, without the user having to lean forward or extend arm reach. Specifically, the controls are on a lateral or outboard side of the seat (e.g., away from the vehicle centerline), where for example they do not interfere with the seat belt buckle. However, the extended forward-backward travel range can bring the seat into proximity with the vehicle's rear wheel well, leaving a space of only a few centimeters for the user's hand to operate the seat control handles. The control handles therefore include ergonomic features that allow the user's hand to reach and operate them in this restricted space.

The present disclosure thus provides a vehicle seat with the ability to move along a high range of motion as well as providing one or more low-profile seat control levers (e.g., for reclining the seatback or releasing a forward-backward sliding latch) using a hidden pivot lever with cutout access to the handle on a lateral side of the vehicle seat. The resulting narrow profile of the pull handle permits the handle to be lifted despite the reduced clearance on the seat's lateral side. To accomplish this, the handle includes a hidden pivot underneath the seat where the rotational axis is such that the handle does not swing outward through the length of the panel door of the lever actuator. Instead, the handle can rotate at least partially into a recess, in a manner similar to a garage door rotating pivot. In addition to providing a handle on the side of the seat, the present disclosure provides multiple handles of similar design along the side of the seat, where one such lever may be used to operate the reclining seat back, another to operate the slide control, and in some cases a third may be used to actuate additional accessories such as an ottoman, foot rest, seat raise/lower control, etc.

This design provides an improvement over existing vehicle seats because it uses a seat control capable of reclining or sliding a vehicle seat by pulling a handle laterally on the side of the vehicle seat. A handle capable of being pulled laterally allows for easier access in adjusting the recline or sliding position of the vehicle seat. In addition, a very long sliding rail for the vehicle seat is available to allow for a higher range of motion for the vehicle seat in the vehicle cabin area. However, this added length of the sliding rail creates a need to modify the seat controls. When the seat is slid all the way backward on the extended rails, a restricted hand space is created around the seat controls due to the location of the wheel well inside the cabin compartment, as well as other interior trim and door panels. Given the amount of space along the side of the seat where the recline and slide controls are located, there is not enough clearance to operate conventional pull handles, where the handle housing and lever clearance must have adequate space/clearance along the side of the seat. Conventional systems using such pull handles either compromise clearance along the outside area of the seat, reduce the width of the seat, or have to narrow the seat width or bolster area to offer adequate user access to the controls. The present disclosure overcomes these difficulties.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes only, and should not be considered to limit the scope of the extended-slide vehicle seat. Certain features may be added, removed, or modified without departing from the spirit of the claimed subject matter.

Figure 1:
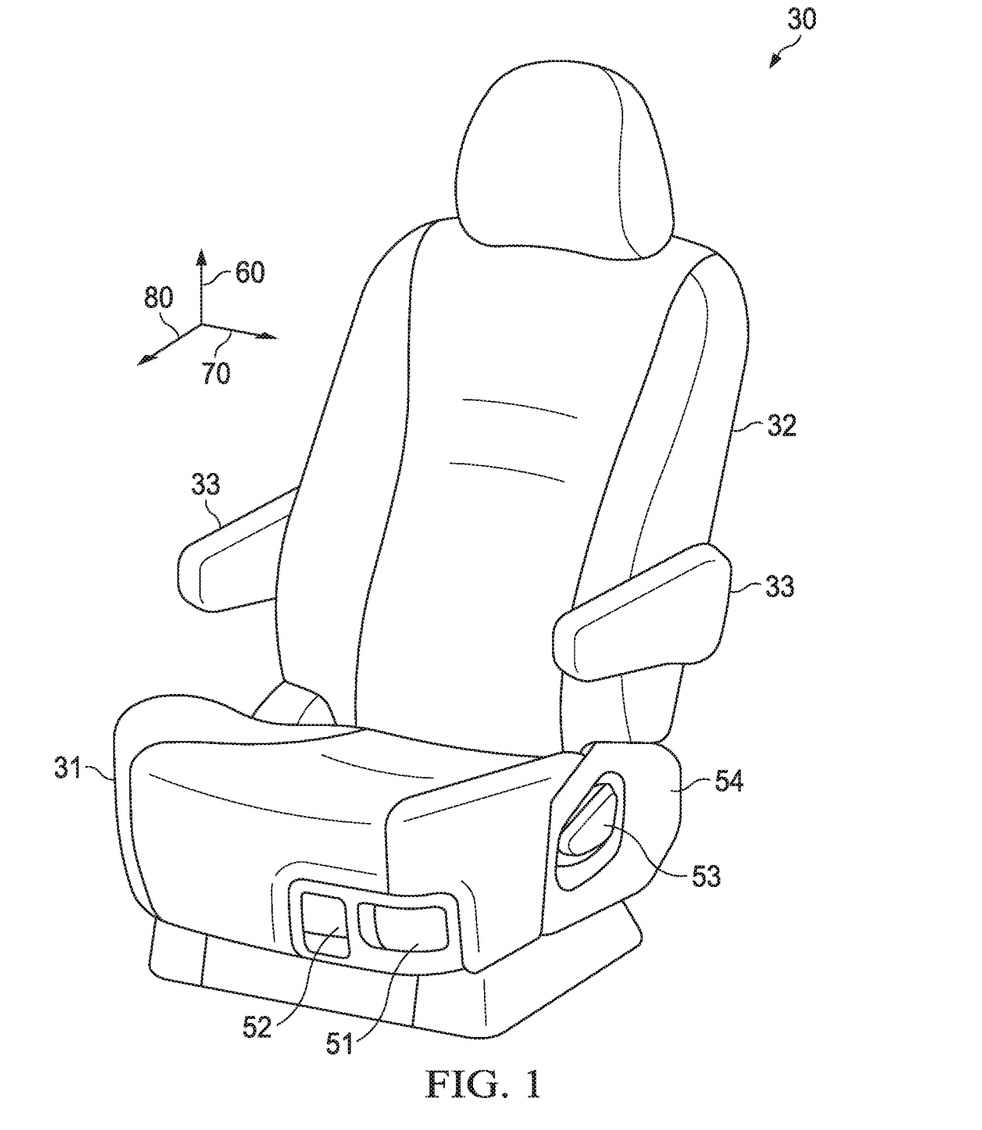
FIG. 1 is an exemplary representation of a vehicle seat according to aspects of the present disclosure.

FIG. 1 is an exemplary representation of a vehicle seat according to aspects of the present disclosure. In the example shown in FIG. 1, the vehicle seat 30 includes a backrest 32, armrests 33, seat cushion 31, first control handle 51, second control handle 52, and third control handle 53. The control handles may each operate a different seat function such as a recline control, slide control, raise/lower control, seat heater control, footrest control, etc. In this example, control handle 51 pivots around a vertical axis 60, whereas control handles 52 and 53 rotate around a lateral axis 70. None of the control handles shown in FIG. 1 rotate around the longitudinal axis 80.

In order to access and operate the first control handle 51 or second control handle 52, a user must lean forward and reach downward, which may not be ergonomically favorable. By contrast, control handle 53 is accessible on a lateral side 54 of the seat (e.g., an outboard side outboard, away from the vehicle centerline), where the user can access and operate it merely by hanging their outboard arm downward. In some cases, this will be ergonomically much more favorable. However, because control handle 53 pivots around the lateral axis 70, it may still create some ergonomic difficulties for the user. The present disclosure therefore provides seat control handles that are located on a lateral side of the seat and that rotate around the longitudinal axis 80 using a hidden pivot, which may offer significant ergonomic advantages when operated in a tight space (e.g., adjacent to, proximate to, or within about 30-40 millimeters of a rear wheel well of the vehicle, thus providing a clearance of only a few centimeters).

Before continuing, it should be noted that the examples described above are provided for purposes of illustration, and are not intended to be limiting. Other devices and/or device configurations may be utilized to carry out the operations described herein.

Figure 2:
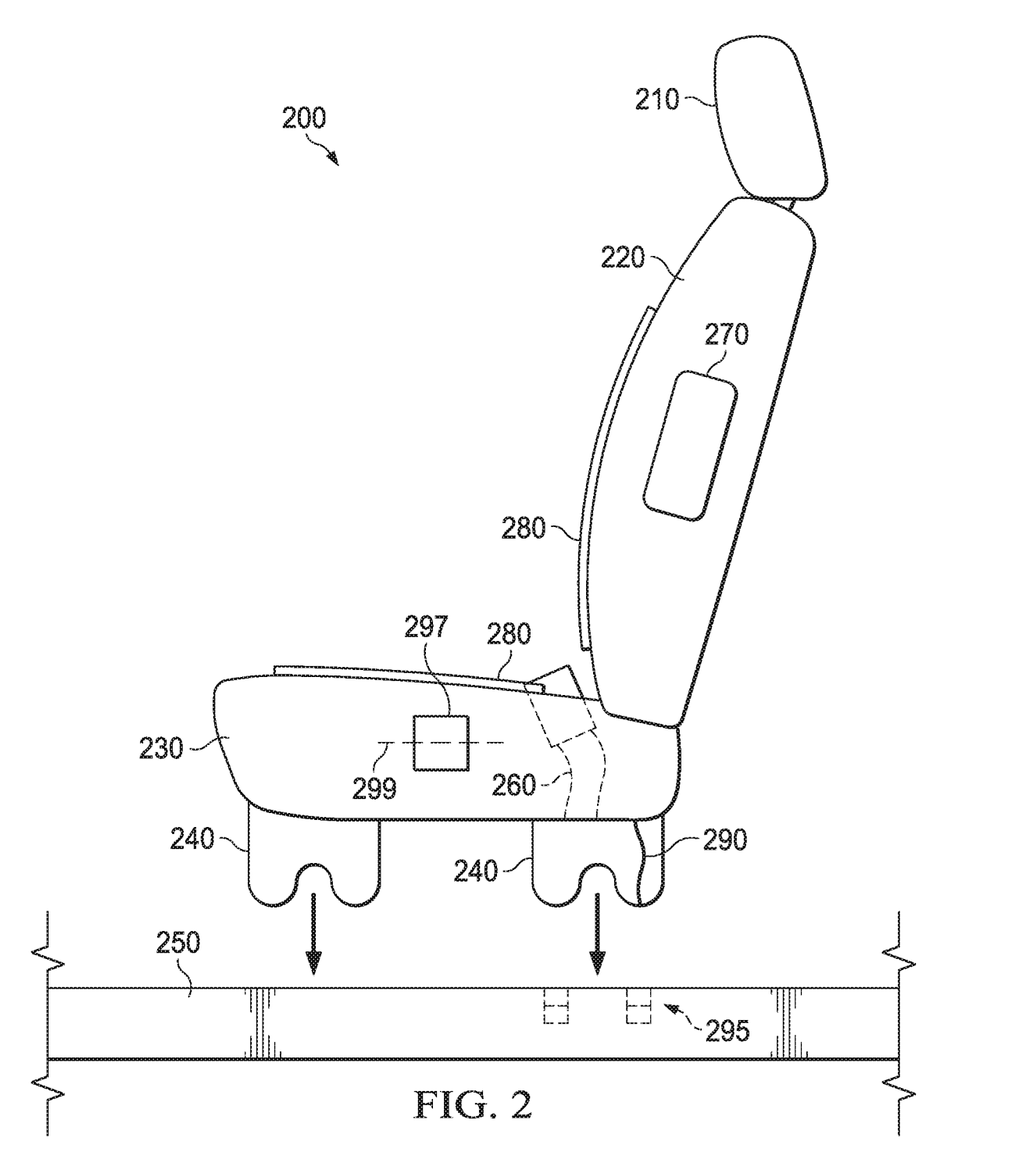
FIG. 2 is side view of an exemplary extended-slide vehicle seat, in accordance with at least one embodiment of the present disclosure.

FIG. 2 is side view of an exemplary extended-slide vehicle seat, in accordance with at least one embodiment of the present disclosure. The removable, extended-slide vehicle seat 200 includes a headrest 210, backrest 220, seat or seat cushion 230, seat mounts 240, slide rails 250, and seat belt buckle 260. A seat mount 240 may be coupled to a slide rail 250 by a latch, bolt, or other attachment method, and may include a rail lock to permit or prevent the seat mount (and therefore the seat) from sliding along the rail. The example vehicle seat 200 further includes a side-impact airbag 270, seat heaters 280, and a wiring harness 290. The rails 250 may include at least one electrical contact 295, such that when the seat is moved forward or backward into in a contact position, electrical power is supplied to the removable, extended-slide vehicle seat 200 via the wiring harness 290. In some embodiments the electrical power runs one or more of seat heaters, seat coolers, passenger weight sensors, seat belt buckle sensors, recline motors, lift/tilt motors, or other motors, actuators, or accessories.

A longer than usual sliding rail for a vehicle seat is disclosed. The sliding rail extends far enough to provide a wider range of motion than conventional sliding rails. In addition, the sliding rail can provide the vehicle set with power when the vehicle seat is slid into a particular position with electrical power available. In some embodiments, electrical contact is made only when the seat is positioned over a single contact 295. In other embodiments, multiple contacts 295 provide power at multiple different slide positions.

In still other embodiments, electrical contact is provided at all positions of the vehicle seat 200 along the sliding rails 250.

In the example shown in FIG. 2, extended-slide vehicle seat 200 also includes a recline control 297 that permits the backrest to pivot up or down, or a forward/back sliding control 297 that engages or releases a rail lock coupled to a seat mount. The control 297 is located on an outer or lateral side of the seat 230, e.g., away from the vehicle centerline and facing a side panel of the vehicle. The control handle pivots and around a recessed rotational axis or pivot axis 299 that is aligned with the longitudinal axis of the vehicle. However, depending on the implementation, the pivot axis may also be oriented vertically, or at any other angle between longitudinal and vertical. The narrow profile of a pull handle includes a hidden pivot underneath the seat cushion where the rotational axis does not swing the handle out the full length of the lever actuator, but rather rotates it at least partially into a recess, in a manner similar to a garage door rotating pivot, such that only a small portion of the handle extends past the lateral side of the seat. Multiple handles of similar design may be employed along the side of the seat, where one such lever may be used to operate the reclining seat back, another to operate the forward-backward sliding control, another to operate an accessory such as an ottoman, etc. One such handle may for example be located underneath the seatbelt harness on the bottom of the vehicle seat cushion. Because the handle is pulled laterally, around a longitudinal pivot axis, and opens similarly to a garage door, the handle is ergonomic and easy to access. When the handle is pulled, it may for example recline the vehicle seat or release the seat mounts or 240, permitting the seat to slide forward or backward on the rails 250. In general, using such a handle for the recline control is more complex due to the orientation and movement direction of recline mechanisms (e.g., cables, pulleys, etc.) within or underneath the vehicle seat 200.

Figure 3A:
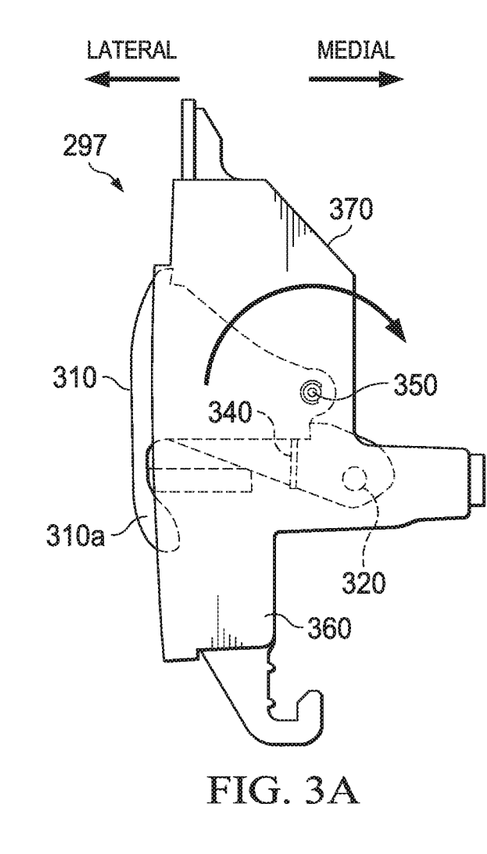
FIG. 3A shows an example low-profile seat adjustment control incorporating a hidden pivot, in accordance with at least one embodiment of the present disclosure.

FIG. 3A shows an example low-profile seat adjustment control 297 incorporating a hidden pivot, in accordance with at least one embodiment of the present disclosure. The adjustment control 297 includes a handle 310 and a pivot pin 350 that penetrates the handle, forming a rotatable coupling. Both ends of the pivot pin are further rotatably coupled to the sides of a first recess 360, sized and shaped to receive the handle 310 when the handle is in a vertical (e.g., neutral or non-actuated) position as shown. When the handle 310 is rotated into an actuated (e.g., horizontal or nearly horizontal) position, at least a portion of it is received by a second recess 370. In some embodiments, the second recess 370 may be an opening in the first recess 360. In other embodiments, the second recess 370 may be a portion of the first recess 360, such that the first and second recesses form a single recess.

In some embodiments, a grip portion 310a of the handle 310 is located on a front or lateral side of the handle 310 and proximate to a front or lateral side of the recess 360, whereas the pivot pin is located proximate to a rear or medial side of the handle 310 and the recess 360. This arrangement permits the handle 310 to be rotated upward into an actuation position (e.g., horizontal, 45 degrees, etc.), with a majority of the handle 310 remaining disposed within the first and second recesses, and only a small portion (e.g., less than 10 millimeters) protruding beyond (e.g., lateral of) the lateral edge of the seat. Thus, this handle design can be used in areas of the vehicle where clearance around the handle 310 is restricted. In some embodiments, recess 360 and recess 370 are two separate but overlapping structures. In other embodiments, recess 360 and recess 370 form a single recess capable of receiving the handle 310 in both the actuated and non-actuated positions, as well as all positions in between.

Also visible are a return spring 340, which returns the handle 310 to a neutral position as shown, and a cable attachment hole 320, which permits an actuation cable (not pictured) to be operated by the handle 310. The actuation cable may for example operate a recline mechanism, a slide mechanism, or other seat control mechanism. A slide mechanism may for example release a rail lock portion of a seat mount, permitting the vehicle seat to slide forward and backward on sliding rails.

Figure 3B:
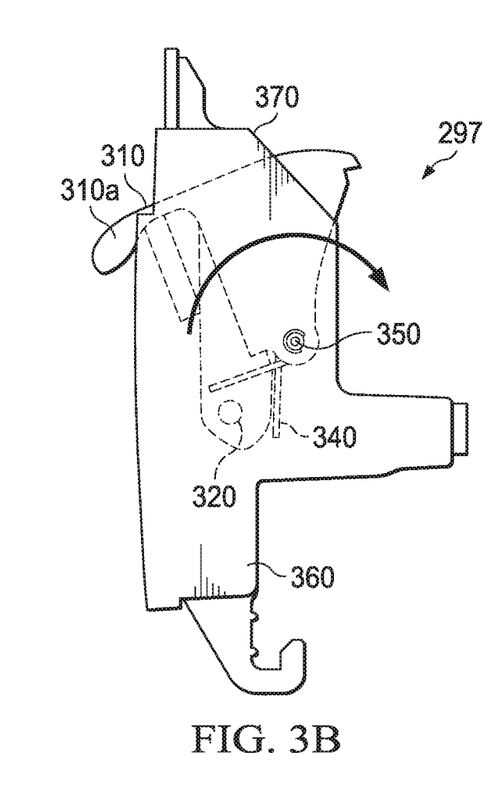
FIG. 3B shows an example low-profile seat adjustment control incorporating a hidden pivot, in accordance with at least one embodiment of the present disclosure.

FIG. 3B shows an example low-profile seat adjustment control 297 incorporating a hidden pivot, in accordance with at least one embodiment of the present disclosure. Visible are the handle 310, grip portion 310a, cable attachment hole 320, return spring 340, pivot pin 350, first recess 360, and opening or second recess 370. In the example shown in FIG. 3B, the handle 310 is in a raised or actuated position, wherein the position of the cable attachment hole is substantially lateral as compared with the more medial position shown in FIG. 3A. This change in the position of the cable attachment hole 320 permits the handle 310 to operate an actuation cable as described above.

Figure 4:
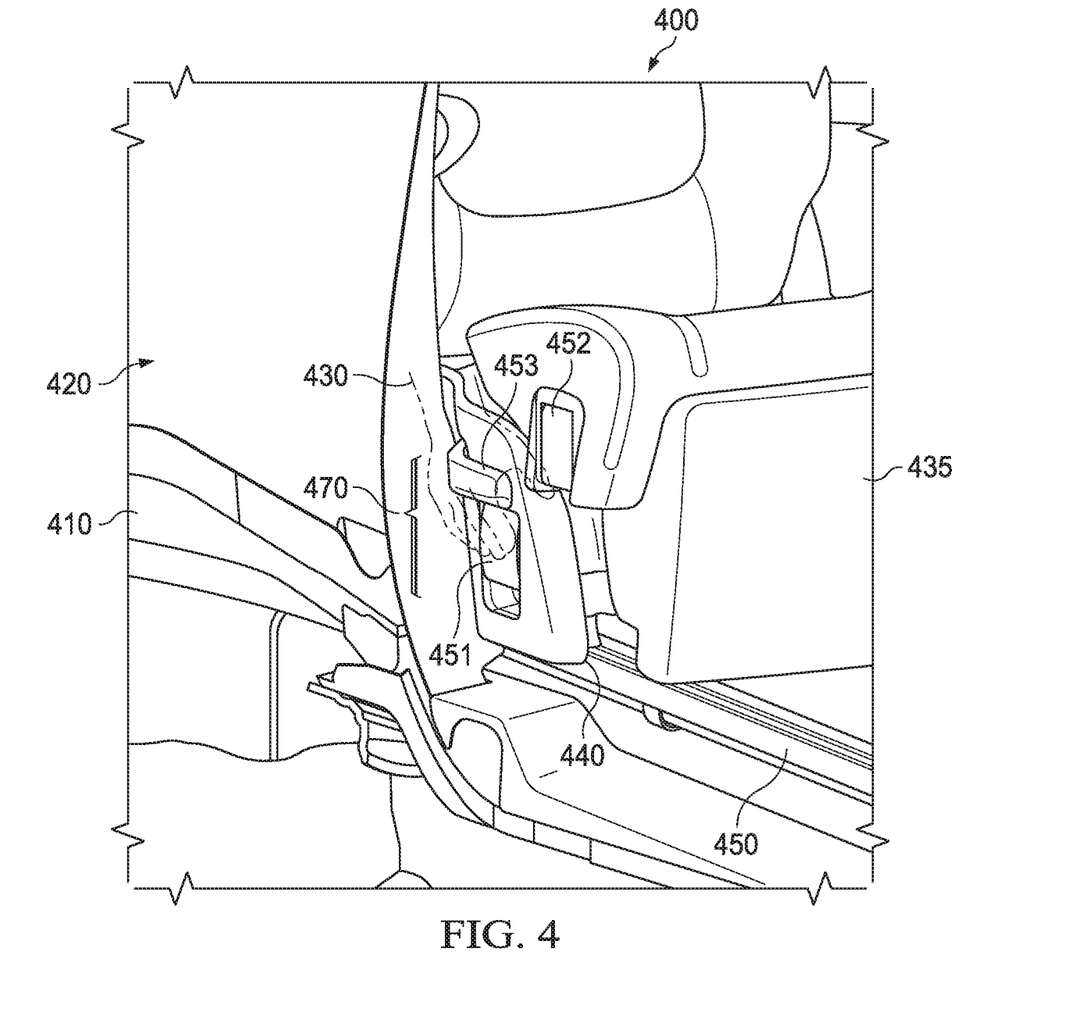
FIG. 4 is a perspective view of an example extended-slide vehicle seat, in accordance with at least one embodiment of the present disclosure.

FIG. 4 is a perspective view of an example extended-slide vehicle seat 400, in accordance with at least one embodiment of the present disclosure. The extended-slide vehicle seat 400 is coupled to the vehicle underbody 410, and is capable of sliding backward until it is in proximity to the rear vehicle interior trim 420. The rear vehicle interior trim 420 may create a restricted clearance for a user's hand 430 to access seat controls. The extended-slide vehicle seat 400 includes seat mounts 440, slide rails 450, a recline control handle 453, a slide control handle 451, and an ottoman control handle 452 configured to raise or lower an ottoman 435.

In the example shown in FIG. 4, the recline control handle 453 is configured to rotate around a lateral axis, as shown for example with handle 53 in FIG. 1. However, given the restricted hand space 470 created by the vehicle's rear vehicle interior trim 420, placement of a traditional seat control handle 451 below the recline control handle 453 could make the control handle 451 difficult for the user's hand 430 to operate. Therefore, the slide control handle 451 is a low-profile handle with hidden pivot as shown for example in FIG. 3. The configuration shown in FIG. 4 permits at least a portion of the palm of the user's hand 430 to rest on the recline control handle 453 such that the fingers are able to reach and operate the slide control lever 451. In an example, a clearance of about 35 millimeters between the inner panel of the vehicle interior trim 420 and the outer edge of the recline handle 450 is sufficient for the slide control handle 451 to be operated by humans ranging from a $5^{th}$ percentile female to a $95^{th}$ percentile male.

Figure 5:
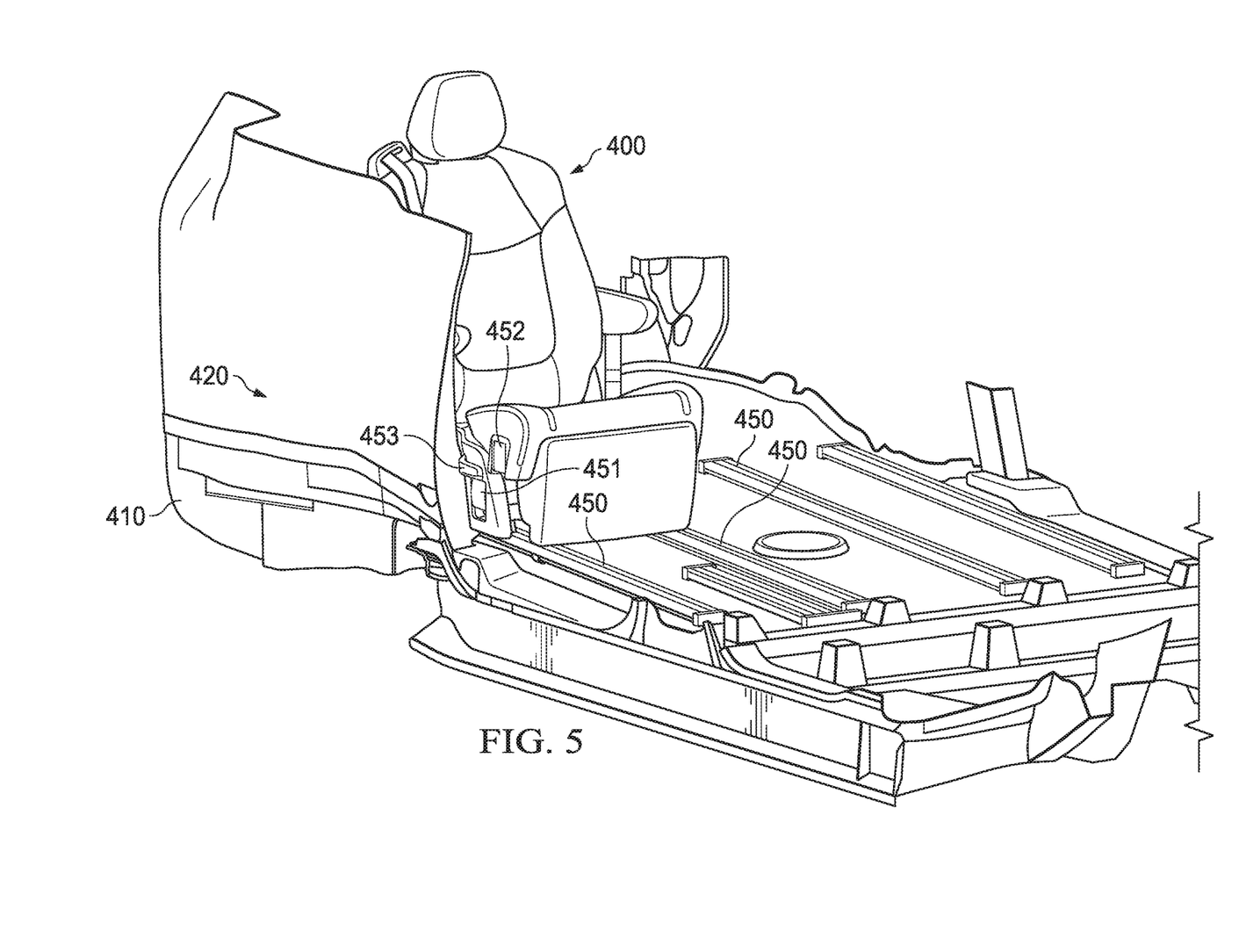
FIG. 5 is a perspective view of an example extended-slide vehicle seat, in accordance with at least one embodiment of the present disclosure.

FIG. 5 is a perspective view of an example extended-slide vehicle seat 400, in accordance with at least one embodiment of the present disclosure. Visible are the vehicle seat 400, vehicle underbody 410, rear wheel well structure or interior trim 420, slide rails 450, slide control handle 451, ottoman control handle 452, and recline control handle 453.

Figure 6:
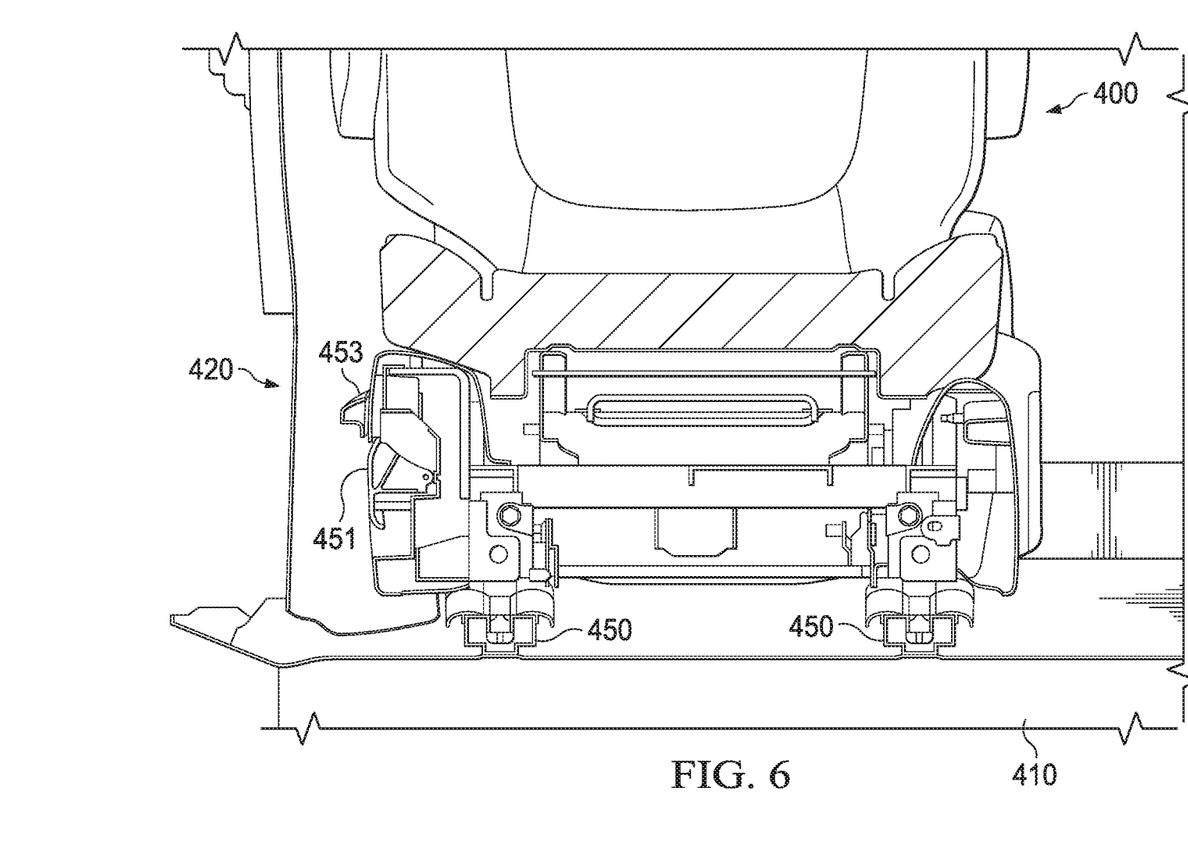
FIG. 6 is a front cross-sectional view of an example extended-slide vehicle seat 400, in accordance with at least one embodiment of the present disclosure.

FIG. 6 is a front cross-sectional view of an example extended-slide vehicle seat 400, in accordance with at least one embodiment of the present disclosure. Visible are the vehicle seat 400, vehicle underbody 410, rear wheel well structure or interior trim 420, slide rails 450, slide control handle 451, and recline control handle 453.

Figure 7:
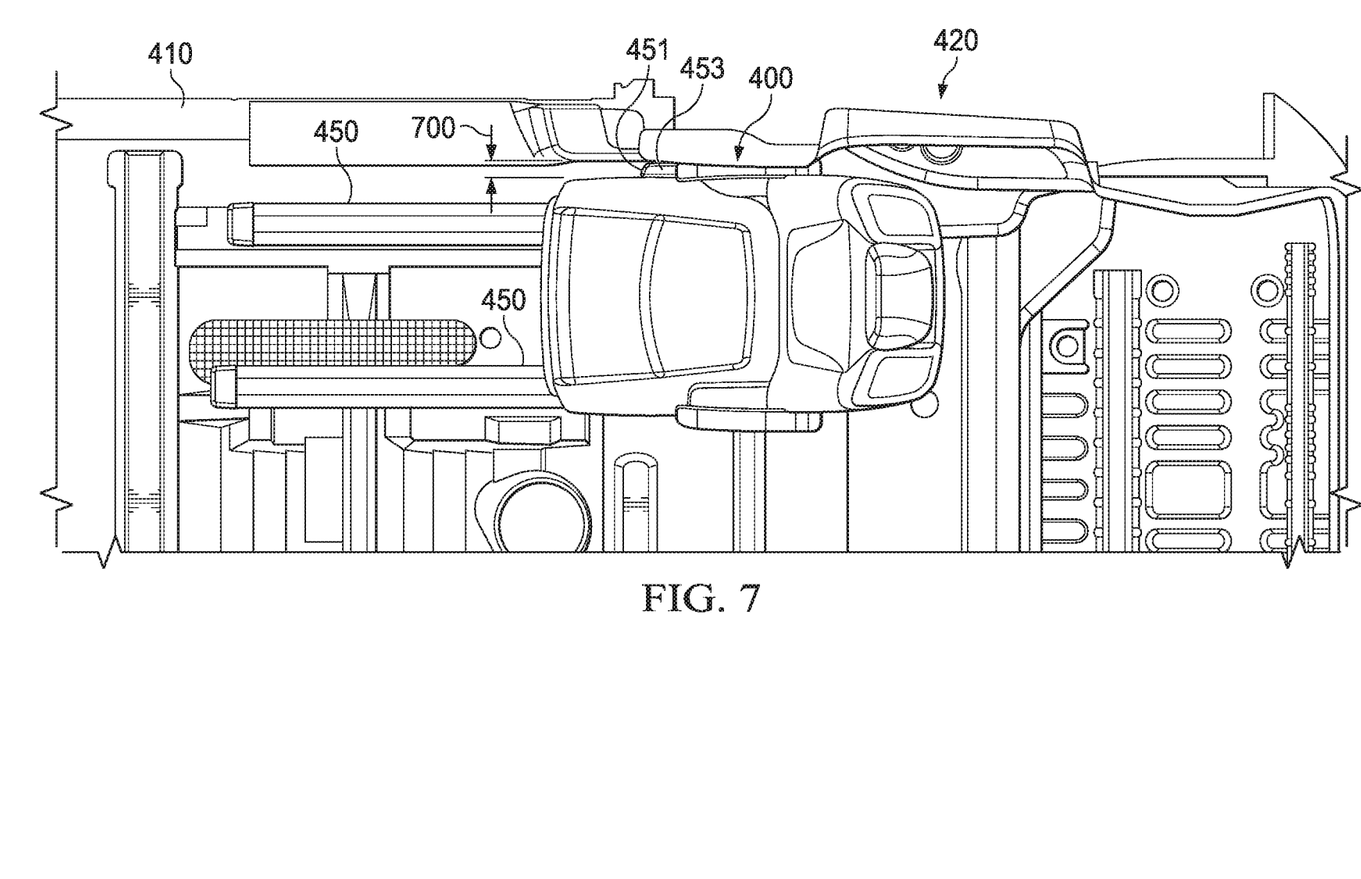
FIG. 7 is a top view of an example extended-slide vehicle seat, in accordance with at least one embodiment of the present disclosure.

FIG. 7 is a top view of an example extended-slide vehicle seat 400, in accordance with at least one embodiment of the present disclosure. Visible are the vehicle seat 400, vehicle underbody 410, rear wheel well structure or interior trim 420, slide rails 450, slide control handle 451, and recline control handle 453. In an example, when the vehicle seat 400 is slid into its rearmost position, the clearance distance 700 between the wheel well structure 420 and the recline control handle 453 is about 35 millimeters. However, the design of the slide control handle 451 permits a user's hand to operate the slide control handle 451 within this confined space.

Figure 8:
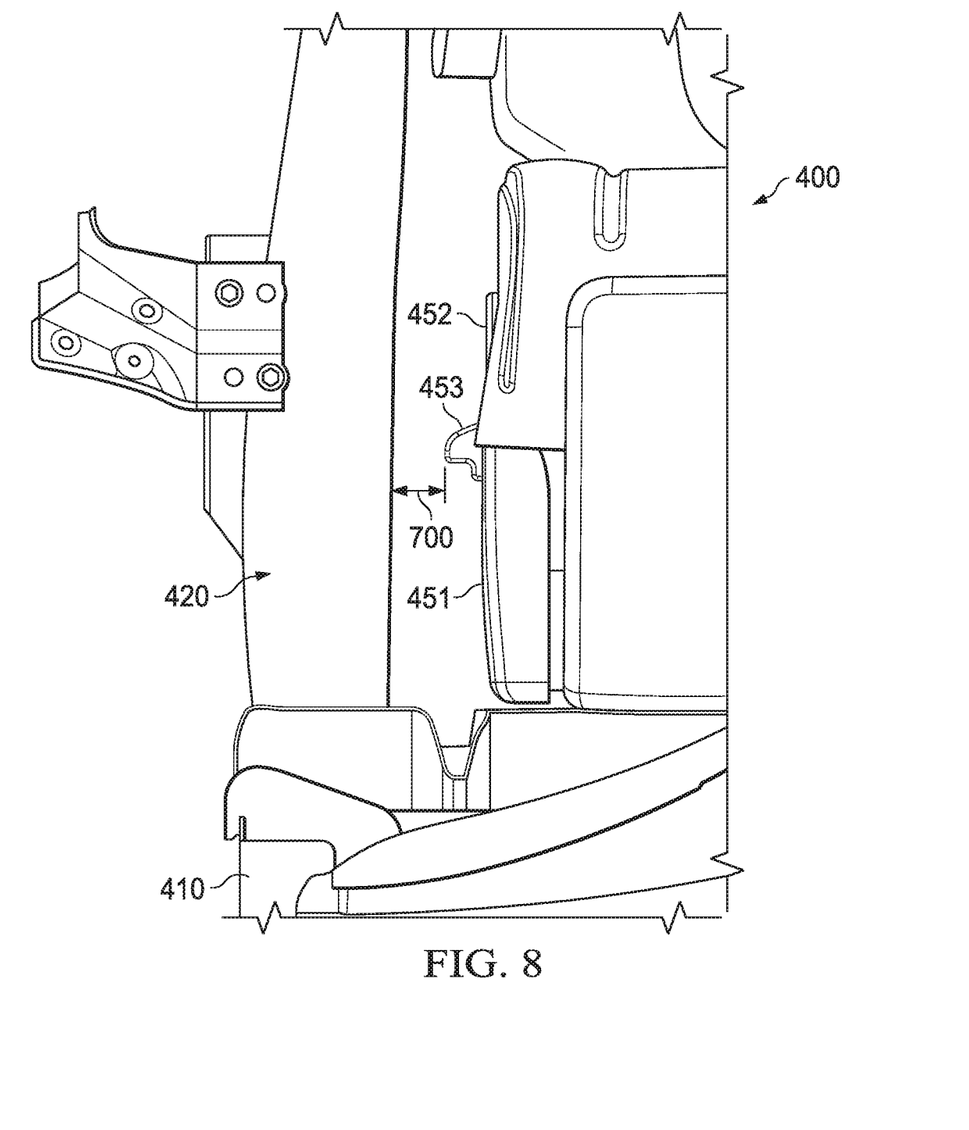
FIG. 8 is a front view of an example extended-slide vehicle seat, in accordance with at least one embodiment of the present disclosure.

FIG. 8 is a front view of an example extended-slide vehicle seat 400, in accordance with at least one embodiment of the present disclosure. Visible are the vehicle seat 400, vehicle underbody 410, rear wheel well structure or interior trim 420, slide control handle 451, and recline control handle 453. In an example, when the vehicle seat 400 is slid into its rearmost position, the clearance distance 700 between the wheel well structure 420 and the recline control handle 453 is about 35 millimeters.

As will be readily appreciated by those having ordinary skill in the art after becoming familiar with the teachings herein, the extended-slide vehicle seat advantageously provides a capability to slide a vehicle seat backward until it is proximate to inward-protruding elements of the rear wheel well, and provides ergonomic control handles (e.g., slide control, recline control, ottoman control, etc.) that can be readily reached and operated by a user in the resulting low-clearance space. This improved range of seating positions improves the functioning of the vehicle by permitting increased user comfort, increased operability, and a greater range of possible uses.

A number of variations are possible on the examples and embodiments described above. Depending on the implementation, the positions or orientations may be different than shown herein. For example, improved ergonomic function may be achieved if the pivot axis of the seat control handles is tilted away from horizontal (e.g., by an angle of 10 degrees, 30 degrees, 45 degrees, or other values both larger and smaller). Control handles may be taller, shorter, wider, narrower, thicker, thinner, or of different shape (e.g., circular, oval, polygonal, or otherwise) than shown herein. The technology described herein may be used in vehicles of other types, including campers, mobile homes, commercial towing vehicles, aircraft, and watercraft.

Accordingly, the logical operations making up the embodiments of the technology described herein are referred to variously as operations, steps, objects, elements, components, or modules. Furthermore, it should be understood that these may be arranged or performed in any order, unless explicitly claimed otherwise or a specific order is inherently necessitated by the claim language.

All directional references e.g., upper, lower, inner, outer, upward, downward, left, right, lateral, medial, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the extended-slide vehicle seat. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the extended-slide vehicle seat as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising:
   a vehicle seat comprising:
   a backrest;
   a cushion;
   a wiring harness capable of providing electrical power to one or more vehicle seat accessories;
   at least one sliding rail comprising at least one electrical contact;
   at least one seat mount coupled to the at least one sliding rail,
      wherein when a rail lock of the at least one seat mount is released, the vehicle seat including the at least one seat mount is configured to slide forward or backward along the at least one sliding rail,
      wherein the seat mount is configured to provide electrical power to the wiring harness when the seat mount is positioned in contact with the at least one electrical contact; and
   a recline control positioned on a lateral side of the vehicle seat and configured to control an orientation of the backrest relative to the cushion, the recline control comprising:
      a pivot pin comprising a rotation axis parallel to a longitudinal axis of the vehicle;
      a recline control handle coupled to the pivot pin,
         wherein the recline control handle is configured to rotate around the pivot pin from a first orientation to a second orientation; and
      a recess disposed within the lateral side of the cushion and configured to receive at least a portion of the recline control handle in both the first orientation and the second orientation,
      wherein the recline control is configured to, in the first orientation, prevent the backrest from varying between a generally upright position and a backward-leaning position and, in the second orientation, permit the backrest to vary between a generally upright position and a backward-leaning position.

2. The vehicle of claim 1, wherein the recess comprises a first portion for receiving the recline control handle in the first orientation and a second portion for receiving the recline control handle in the second orientation.

3. The vehicle of claim 1, wherein, in both the first orientation and the second orientation, a grip portion of the recline control handle is disposed on a lateral side of the recline control handle and proximate to a lateral side of the recess.

4. The vehicle of claim 3, wherein the pivot pin is disposed proximate to a medial side of the recline control handle and a medial side of the recess, such that in both the first orientation and the second orientation, no portion of the recline control handle protrudes more than about 10 millimeters lateral of the lateral side of the vehicle seat.

5. The vehicle of claim 1, wherein the at least one sliding rail comprises two sliding rails, and the at least one seat mount comprises two seat mounts.

6. The vehicle of claim 1, wherein the at least one sliding rail is coupled to an underbody of the vehicle.

7. The vehicle of claim 1, wherein the at least one sliding rail is configured to permit the vehicle seat to slide backward such that the recline control handle is proximate to a rear wheel well of the vehicle.

8. The vehicle of claim 1, wherein the recline control handle is configured to be operable by a user's hand when the recline control handle is proximate to a rear wheel well of the vehicle.

9. The vehicle of claim 1, wherein the at least one electrical contact comprises a plurality of electrical contacts.

10. The vehicle of claim 1, wherein the at least one electrical contact comprises an electrical contact that is continuous along at least a portion of the at least one sliding rail.

11. The vehicle of claim 1, wherein the one or more vehicle seat accessories include at least one of a seat belt buckle sensor, a seat heater, a seat cooler, a seat motor, a seat actuator, or a weight sensor.

12. A vehicle, comprising:
a vehicle seat comprising:
a backrest;
a cushion;
at least one sliding rail;
at least one seat mount coupled to the at least one sliding rail,
wherein when a rail lock of the at least one seat mount is released, the vehicle seat including the rail lock is configured to slide forward or backward along the at least one sliding rail,
a recline control positioned on a lateral side of the vehicle seat and configured to control an orientation of the backrest relative to the cushion, the recline control comprising:
a first pivot pin comprising a rotation axis parallel to a lateral axis of the vehicle;
a recline control handle coupled to the first pivot pin, wherein the recline control handle is configured to rotate around the first pivot pin from a first recline control orientation to a second recline control orientation; and
a slide control positioned on the lateral side of the cushion below the recline control, the slide control comprising:
a second pivot pin comprising a rotation axis parallel to a longitudinal axis of the vehicle;
a slide control handle coupled to the second pivot pin, wherein the slide control handle is configured to rotate around the second pivot pin from a first slide control orientation to a second slide control orientation; and
a recess disposed within the lateral side of the cushion and configured to receive at least a portion of the slide control handle in both the first slide control orientation and the second slide control orientation,
wherein the slide control handle is configured to engage the rail lock in the first slide control orientation and release the rail lock in the second slide control orientation.

13. The vehicle of claim 12, wherein the recline control handle and slide control handle are configured such that when fingers of a user's hand are operating the slide control handle, at least a portion of a palm of the user's hand can rest on the recline control handle.

14. The vehicle of claim 12, wherein the recess comprises a first portion for receiving the slide control handle in the first slide control orientation and a second portion for receiving the slide control handle in the second slide control orientation.

15. The vehicle of claim 12, wherein, in both the first slide control orientation and the second slide control orientation, a grip portion of the slide control handle is disposed on a lateral side of the slide control handle and proximate to a lateral side of the recess.

16. The vehicle of claim 15, wherein the second pivot pin is disposed proximate to a medial side of the recline control handle and a medial side of the recess, such that in both the first slide control orientation and the second slide control orientation, no portion of the recline control handle protrudes more than about 10 millimeters lateral of the lateral side of the cushion.

17. The vehicle of claim 12, wherein the at least one sliding rail comprises two sliding rails, and the at least one seat mount comprises two seat mounts.

18. The vehicle of claim 12, wherein the at least one sliding rail is configured to permit the vehicle seat to slide backward such that the recline control handle is proximate to a rear wheel well of the vehicle.

19. The vehicle of claim 12, wherein the recline control handle is configured to be operable by a user's hand when the recline control handle is proximate to a rear wheel well of the vehicle.

20. A system comprising:
a vehicle;
a vehicle seat positioned within the vehicle, the vehicle seat comprising;
a backrest;
a cushion;
at least one sliding rail;
at least one seat mount coupled to the at least one sliding rail,
wherein when a rail lock of the at least one seat mount is released, the vehicle seat including the at least one seat mount is configured to slide forward or backward along the at least one sliding rail;
a recline control positioned on a lateral side of the vehicle seat and configured to control an orientation of the backrest relative to the cushion, the recline control comprising:
a first pivot pin comprising a rotation axis parallel to a longitudinal axis of the vehicle;
a recline control handle coupled to the first pivot pin, wherein the recline control handle is configured to rotate around the first pivot pin from a first recline control orientation to a second recline control orientation;
a first recess disposed within the lateral side of the cushion and configured to receive at least a portion of the recline control handle in both the first recline control orientation and the second recline control orientation; and a slide control positioned on the lateral side of the vehicle seat below the recline control, the slide control comprising:
  a second pivot pin comprising a rotation axis parallel to a longitudinal axis of the vehicle;
  a slide control handle coupled to the second pivot pin, wherein the slide control handle is configured to rotate around the second pivot pin from a first slide control orientation to a second slide control orientation; and
  a second recess disposed within the lateral side of the vehicle seat and configured to receive at least a portion of the slide control handle in both the first slide control orientation and the second slide control orientation,
wherein the slide control handle is configured to engage the rail lock in the first slide control orientation and release the rail lock in the second slide control orientation.

* * * * *